(12) United States Patent
Liu et al.

(10) Patent No.: US 11,030,381 B2
(45) Date of Patent: Jun. 8, 2021

(54) LEAKAGE ANALYSIS ON SEMICONDUCTOR DEVICE

(71) Applicant: TAIWAN SEMICONDUCTOR MANUFACTURING CO., LTD., Hsinchu (TW)

(72) Inventors: Cheng-Hua Liu, Hsinchu County (TW); Yun-Xiang Lin, Hsinchu County (TW); Yuan-Te Hou, Hsinchu (TW); Chung-Hsing Wang, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/586,658

(22) Filed: Sep. 27, 2019

(65) Prior Publication Data

US 2020/0226229 A1    Jul. 16, 2020

Related U.S. Application Data

(60) Provisional application No. 62/793,350, filed on Jan. 16, 2019.

(51) Int. Cl.
*G06F 30/398* (2020.01)
*G06F 30/367* (2020.01)
(Continued)

(52) U.S. Cl.
CPC ............ *G06F 30/398* (2020.01); *G06F 30/20* (2020.01); *G06F 30/367* (2020.01); *G06F 30/39* (2020.01);
(Continued)

(58) Field of Classification Search
CPC .. G06F 30/392; G06F 30/398; G06F 2119/18; G06F 30/39; G06F 2111/20;
(Continued)

(56) References Cited

U.S. PATENT DOCUMENTS

| 6,718,524 | B1 * | 4/2004 | Mbouombouo | ..... G01R 31/275 716/52 |
| 7,100,144 | B2 * | 8/2006 | Jacobson | ............... G06F 30/327 716/103 |

(Continued)

FOREIGN PATENT DOCUMENTS

| TW | 201142332 A | 12/2011 |
| TW | 201421053 A | 6/2014 |
| TW | 201809709 A | 3/2018 |

*Primary Examiner* — Helen Rossoshek
(74) *Attorney, Agent, or Firm* — Maschoff Brennan

(57) ABSTRACT

A method is utilized to calculate a boundary leakage in a semiconductor device. A boundary is detected between a first cell and a second cell, which the first cell and the second cell are abutted to each other around the boundary. Attributes associated with cell edges of the first cell and the second cell are identified. A cell abutment case is identified based on the attributes associated with the cell edges of the first cell and the second cell. An expected boundary leakage between the first cell and the second cell is calculated based on leakage current values associated with the cell abutment case and leakage probabilities associated with the cell abutment case.

20 Claims, 14 Drawing Sheets

(51) Int. Cl.
*G06F 30/20* (2020.01)
*G06F 30/39* (2020.01)
*G06F 119/10* (2020.01)
*G06F 30/392* (2020.01)
*G06F 119/18* (2020.01)
*G06F 111/20* (2020.01)

(52) U.S. Cl.
CPC ........ *G06F 30/392* (2020.01); *G06F 2111/20* (2020.01); *G06F 2119/10* (2020.01); *G06F 2119/18* (2020.01)

(58) Field of Classification Search
CPC .... G06F 2119/10; G06F 30/367; G06F 30/20; H01L 27/0207
See application file for complete search history.

(56) References Cited

U.S. PATENT DOCUMENTS

| | | | |
|---|---|---|---|
| 7,816,740 B2 * | 10/2010 | Houston | H01L 27/0207 257/369 |
| 8,451,026 B2 * | 5/2013 | Biggs | G06F 30/39 326/101 |
| 8,513,978 B2 * | 8/2013 | Sherlekar | G06F 30/394 326/101 |
| 8,631,366 B2 * | 1/2014 | Hou | G06F 30/39 716/110 |
| 8,661,389 B2 * | 2/2014 | Chern | G06F 30/392 716/118 |
| 8,836,040 B2 * | 9/2014 | Kamal | H01L 27/11807 257/369 |
| 8,863,063 B2 * | 10/2014 | Becker | G06F 30/392 716/118 |
| 8,898,614 B2 * | 11/2014 | Sharma | G06F 30/392 716/123 |
| 8,943,455 B2 * | 1/2015 | Chen | G06F 30/398 716/119 |
| 9,009,641 B2 * | 4/2015 | Becker | G06F 30/392 716/118 |
| 9,058,462 B2 * | 6/2015 | Tam | G06F 30/367 |
| 9,318,476 B2 * | 4/2016 | Chen | H01L 27/088 |
| 9,336,346 B2 * | 5/2016 | Herberholz | H01L 29/7835 |
| 9,336,348 B2 * | 5/2016 | Hsieh | H01L 21/823821 |
| 9,337,099 B1 * | 5/2016 | Jain | H01L 21/823431 |
| 9,495,506 B2 * | 11/2016 | Chen | G06F 30/392 |
| 9,741,703 B1 * | 8/2017 | Lam | H01L 27/11807 |
| 10,276,445 B2 * | 4/2019 | Fan | H01L 29/6681 |
| 10,467,374 B2 * | 11/2019 | Peng | G06F 30/367 |
| 10,832,958 B2 * | 11/2020 | Fan | H01L 21/823431 |
| 10,867,115 B2 * | 12/2020 | Peng | G06F 30/367 |
| 2013/0074026 A1 * | 3/2013 | Sharma | G06F 30/392 716/119 |
| 2014/0167815 A1 * | 6/2014 | Penzes | G06F 30/392 326/41 |
| 2015/0067624 A1 * | 3/2015 | Tam | G06F 30/367 716/111 |
| 2016/0110489 A1 * | 4/2016 | Schroeder | G06F 30/392 716/119 |
| 2016/0254190 A1 * | 9/2016 | Hsieh | H01L 29/66545 438/283 |
| 2017/0358565 A1 * | 12/2017 | Hensel | H01L 27/11807 |
| 2017/0371994 A1 * | 12/2017 | Bowers | H01L 27/0924 |
| 2017/0371995 A1 * | 12/2017 | Correale, Jr. | H01L 27/11807 |
| 2019/0005181 A1 * | 1/2019 | Peng | G06F 30/367 |
| 2019/0067116 A1 * | 2/2019 | Fan | H01L 21/823437 |
| 2019/0286783 A1 * | 9/2019 | Yang | G03F 1/36 |
| 2019/0331723 A1 * | 10/2019 | Kim | G06F 30/367 |
| 2020/0019673 A1 * | 1/2020 | Peng | G06F 30/367 |
| 2020/0072901 A1 * | 3/2020 | Goel | G11C 29/36 |
| 2020/0074042 A1 * | 3/2020 | Biswas | G03F 7/70433 |
| 2020/0152661 A1 * | 5/2020 | Tipple | H01L 29/78609 |

* cited by examiner

LUT1

| Voltage Threshold Type | Channel Type | Filler depth | Edge Type | Leakage Current Value |
|---|---|---|---|---|
| LVT | N | 0 | Normal (S, D) | 40 |
| LVT | P | 0 | Normal (S, D) | 70 |
| LVT | N | 4 | FC | 2 |
| LVT | P | 4 | FC | 3 |
| LVT | N | 2 | FB | 12 |
| LVT | P | 2 | FB | 15 |

FIG. 7A

LUT2

| Abutment Type | Leakage Probability |
|---|---|
| S-D | 0.5 |
| D-D | 0.5 |
| S-S | 0 |
| S-FC | 0.5 |
| D-FC | 0.5 |
| S-FB | 0.5 |
| D-FB | 0.5 |

FIG. 7B

| Cell Abutment Case | | Voltage Threshold Type | Abutment Type | Leakage Current Values (LUT1) | Leakage Probability (LUT2) | Expected Boundary Leakage |
|---|---|---|---|---|---|---|
| CA12 | G1p | LVT | S-S | 70 | 0 | 0 |
| | G1n | LVT | S-D | 40 | 0.5 | 20 |
| CA23 | G2p | LVT | D-FC | 3 | 0.5 | 1.5 |
| | G2n | LVT | D-FC | 2 | 0.5 | 1 |

CAL1

FIG. 8

LUT1A

| Voltage Threshold Type | Channel Type | Filler depth | Edge Type | Leakage Current Value |
|---|---|---|---|---|
| LVT | N | 0 | Normal (S, D) | 40 |
| LVT | P | 0 | Normal (S, D) | 70 |
| LVT | N | 4 | FC | 2 |
| LVT | P | 4 | FC | 3 |
| LVT | N | 2 | FB | 12 |
| LVT | P | 2 | FB | 15 |

FIG. 10A

LUT1B

| Voltage Threshold Type | Channel Type | Filler depth | Edge Type | Leakage Current Value |
|---|---|---|---|---|
| SVT | N | 0 | Normal (S, D) | 4 |
| SVT | P | 0 | Normal (S, D) | 7 |
| SVT | N | 4 | FC | 0.2 |
| SVT | P | 4 | FC | 0.3 |
| SVT | N | 2 | FB | 1.2 |
| SVT | P | 2 | FB | 1.5 |

FIG. 10B

LUT2

| Abutment Type | Leakage Probability |
|---|---|
| S-D | 0.5 |
| D-D | 0.5 |
| S-S | 0 |
| S-FC | 0.5 |
| D-FC | 0.5 |
| S-FB | 0.5 |
| D-FB | 0.5 |

FIG. 11

| Cell Abutment Case | | Abutment Type | Possible VT1 | Leakage by VT1 | Possible VT2 | Leakage by VT2 | Leakage Probability | Maximal Leakage | Minimal Leakage | VT Selection Ratio | Expected Boundary Leakage |
|---|---|---|---|---|---|---|---|---|---|---|---|
| CA12 | G1p | S-S | LVT | 70 | SVT | 7 | 0 | 20 | 2 | 0.25 | 6.5 |
|  | G1n | S-D | LVT | 40 | SVT | 4 | 0.5 |  |  |  |  |
| CA23 | G2p | D-FC | LVT | 3 | SVT | 0.3 | 0.5 | 2.5 | 0.25 | 0.25 | 0.8125 |
|  | G2n | D-FC | LVT | 2 | SVT | 0.2 | 0.5 |  |  |  |  |

CAL2

FIG. 12

LEAKAGE ANALYSIS ON SEMICONDUCTOR DEVICE

CROSS-REFERENCE TO RELATED APPLICATION

This application claims priority to U.S. Provisional Application Ser. No. 62/793,350, filed Jan. 16, 2019, which is herein incorporated by reference.

BACKGROUND

When semiconductor devices are to be manufactured, different cells and routings are placed. However, as technology of the semiconductor devices keeps scaling, the process window shrinks dramatically. The manufacturing of the semiconductor devices becomes more and more challenging since the process limitation rule becomes stricter. Semiconductor devices may include several transistor cells arranged in a predefined pattern. For example, in the case of FET (field effect transistor) devices, several source/drain pairs may be fabricated on a substrate and a corresponding gate electrode may be formed over the source/drain pair. In operation, adjacent cells may experience a leakage current at the edge of cell. As a result, adjacent cells may be separated to reduce the overall effect of leakage within the semiconductor device. However, separating adjacent cells results in an increase in the design area of the semiconductor device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7A is an exemplary case of a transistor leakage lookup table in accordance with various embodiments of the present disclosure.

FIG. 7B is an exemplary case of a leakage probability lookup table in accordance with various embodiments of the present disclosure.

FIG. 8 is an exemplary case of a calculation table of the boundary leakage related to the layout of the semiconductor device in embodiments illustrated in FIG. 5.

FIG. 10A is an exemplary case of one transistor leakage lookup table in accordance with various embodiments of the present disclosure.

FIG. 10B is an exemplary case of another transistor leakage lookup table LUT1B in accordance with various embodiments of the present disclosure.

FIG. 11 is an exemplary case of a leakage probability lookup table in accordance with various embodiments of the present disclosure.

FIG. 12 is an exemplary case of a calculation table of the boundary leakage related to the layout of the semiconductor device in embodiments illustrated in FIG. 5.

DETAILED DESCRIPTION

Figure 1:
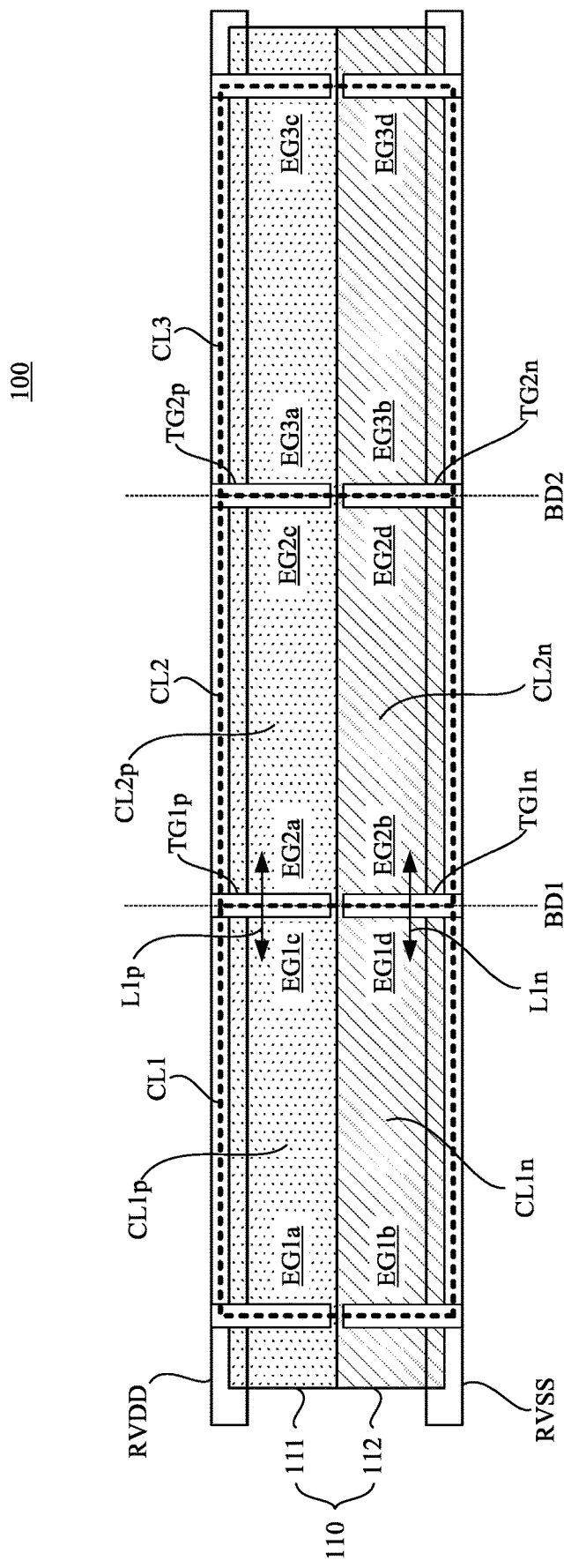
FIG. 1 is an exemplary layout diagram of a semiconductor device in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Semiconductor devices may include several transistor cells arranged in a predefined pattern. For example, in the case of FET (field effect transistor) devices, several source/drain pairs may be fabricated on a substrate and a corresponding gate electrode may be formed over the source/drain pair. In operation, adjacent cells may experience a leakage at a boundary between two cells. One type of semiconductor device that experiences leakage is a semiconductor device including a continuous active area. In the semiconductor device including a continuous active area, adjacent cells experience the typical leakage currents associated with other types of semiconductor devices as well as an additional leakage at the edges of the cells because of the continuous nature of the active area. In the semiconductor device including a continuous active area, the source and drain for multiple semiconductor cells are formed in the continuous active area.

FIG. 1 is an exemplary layout diagram of a semiconductor device in accordance with various embodiments of the present disclosure. As illustratively shown in FIG. 1, there are three cells CL1, CL2 and CL3 in the exemplary layout of the semiconductor device 100 illustrated for demonstration. The number of the cells CL1, CL2 and CL3 in the semiconductor device 100 in FIG. 1 is given for illustrative purposes. Various numbers of the cells are within the contemplated scope of the present disclosure. For simplicity of illustration, three cells CL1, CL2 and CL3 in the semiconductor device 100 are discussed below and given for illustrative purposes.

Each of the cells CL1, CL2 and CL3 includes a plurality of circuit elements and a plurality of nets. A circuit element is an active element or a passive element. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), FinFETs, planar MOS transistors with raised source/drains. Examples of passive elements include, but are not limited to, capacitors, inductors, fuses, and resistors. Examples of nets include, but are not limited to, vias, conductive pads, conductive traces, and conductive redistribution layers.

In the semiconductor device 100 as illustratively shown in FIG. 1, some internal leakage currents exist inside each one of the cells CL1, CL2 and CL3. For example, there will be an internal leakage current flowing from a source terminal to a drain terminal of a P-channel MOSFET inside one of the cells CL1, CL2 and CL3.

In addition to the internal leakage currents, adjacent cells may experience a leakage at a boundary between two adjacent cells. As embodiments illustratively shown in FIG. 1, the cells CL1, CL2 and CL3 are implemented on one continuous active area 110 in which the continuous active area 110 is doped with dopants, and the active area 110 includes a P-type region 111 and an N-type region 112. A right edge of the cell CL1 is abutted to a left edge of the cell CL2 at a boundary BD1. Boundary leakage (e.g., including P-channel leakage L1$p$ and N-channel leakage L1$n$) between the cells CL1 and CL2 may exist at the boundary BD1. A right edge of the cell CL2 is abutted to a left edge of the cell CL3. Boundary leakage (e.g., including P-channel leakage L2$p$ and N-channel leakage L2$n$) between the cells CL2 and CL3 may exist at the boundary BD2. The number of the boundaries BD1 and BD2 in the semiconductor device 100 in FIG. 1 is given for illustrative purposes. Various numbers of the boundaries are within the contemplated scope of the present disclosure.

As illustratively shown in FIG. 1, each of the cells CL1, CL2 and CL3 includes a P-channel portion, e.g., CL1$p$, CL2$p$ or CL3$p$, and an N-channel portion, e.g., CL1$n$, CL2$n$ or CL3$n$. The cell CL1 has four cell edges EG1$a$, EG1$b$, EG1$c$ and EG1$d$. The cell edge EG1$a$ is located at the left edge and on the P-channel portion CL1$p$ of the cell CL1. The cell edge EG1$b$ is located at the left edge and on the N-channel portion CL1$n$ of the cell CL1. The cell edge EG1$c$ is located at the right edge and on the P-channel portion CL1$p$ of the cell CL1. The cell edge EG1$d$ is located at the right edge and on the N-channel portion CL1$n$ of the cell CL1. Similarly, the cell CL2 has four cell edges EG2$a$ (at the left edge and on the P-channel portion CL2$p$), EG2$b$ (at the left edge and on the N-channel portion CL2$n$), EG2$c$ (at the right edge and on the P-channel portion CL2$p$) and EG2$d$ (at the right edge and on the N-channel portion CL2$n$). Similarly, the cell CL3 also has four cell edges EG3$a$, EG3$b$, EG3$c$ and EG3$d$.

In a semiconductor device including a continuous active area and implementing the semiconductor device 100, functional terminals (e.g., source terminals and drain terminals) for different cells can be formed in the same continuous active area 110 as shown in FIG. 1. For example, a source terminal can be located at the cell edge EG1$c$ of the cell CL1 and a drain terminal can be located at the cell edge EG2$a$ of the cell CL2, such that a leakage current L1$p$ may be induced from the cell edge EG1$c$ of the cell CL1 to the cell edge EG2$a$ of the cell CL2 across the boundary BD1. For example, a source terminal can be located at the cell edge EG1$d$ of the cell CL1 and a drain terminal can be located at the cell edge EG2$b$ of the cell CL2, such that a leakage current L1$n$ may be induced from the cell edge EG2$b$ of the cell CL2 to the cell edge EG1$d$ of the cell CL1 across the boundary BD1.

For illustration of FIG. 1, a boundary gate TG1$p$ is implemented at the boundary BD1 between P-channel portions CL1$p$ and CL2$p$ of the cells CL1 and CL2, and the boundary gate TG1$p$ is electrically coupled to a system voltage rail RVDD. The system voltage rail RVDD is configured to provide a high system voltage VDD to the boundary gate TG1$p$. The boundary gate TG1$p$ coupled with the high system voltage VDD is configured to limit (or block) a leakage current between the P-channel portion CL1$p$ of the cell CL1 and the P-channel portion CL2$p$ of the cell CL2. Another boundary gate TG1$n$ is implemented at the boundary BD1 between N-channel portions CL1$n$ and CL2$n$, and the boundary gate TG1$n$ is electrically coupled to another system voltage rail RVSS. The system voltage rail RVSS is configured to provide a low system voltage VSS to the boundary gate TG1$n$. The boundary gate TG1$n$ coupled with the low system voltage VSS is configured to limit (or block) a leakage current between the N-channel portion CL1$n$ of the cell CL1 and the N-channel portion CL2$n$ of the cell CL2. Effectively, the boundary gates TG1$p$ and TG1$n$ are configured to isolate the cells CL1 and CL2.

Similarly, boundary gates TG2$p$ and TG2$n$ are implemented at the boundary BD2 of the cells CL2 and CL3. The boundary gate TG2$p$ is electrically coupled to the system voltage rail RVDD. The boundary gate TG2$p$ coupled with the high system voltage VDD is configured to limit (or block) a leakage current between the P-channel portions CL2p and CL3p of the cells CL2 and CL3. The boundary gate TG2n is electrically coupled to the system voltage rail RVSS. The boundary gate TG2n coupled with the low system voltage VSS is configured to limit (or block) a leakage current between the N-channel portions CL2n and CL3n of the cells CL2 and CL3. The boundary gates TG2p and TG2n are configured to isolate the cells CL2 and CL3.

In some situations, even though the boundary gates TG1p, TG1n, TG2p and TG2n are implemented at the boundaries BD1 and BD2, respectively, between abutted cells, there are still certain levels of boundary leakage currents existed between abutted cells. While designing a layout of the semiconductor device 100, if a total leakage current is examined according to the internal leakage currents within the cells without considering the boundary leakage currents, the estimation of the total leakage current will be inaccurate. Alternatively stated, the estimation of the total leakage current would be more accurate while the internal leakage currents and also the boundary leakage currents are considered to calculate the total leakage current of the semiconductor device 100.

The boundary leakage currents experienced by the CNOD semiconductor device vary depending on the cell abutment cases at boundaries between adjacent cells. For example, the above cell abutment cases include determinations of whether the boundary between abutted cells is a source-source boundary, a source-drain boundary, or a drain-drain boundary, different depths of filler cells, different voltage thresholds, or the like. As discussed in more detail below, these differences between the various transistors can have an effect on the amount of leakage (e.g., the boundary leakage currents) experienced at a boundary of abutted cells. For example, between the different abutment conditions, a Source-to-Drain (S-D) abutment generally experiences more boundary leakage than a Source-to-Source (S-S) abutment.

Because these different attributes of the transistors, the cell edges, the cell abutment cases (e.g., abutment type, voltage thresholds, MOS type, or the like) contribute to differences in the amount of leakage at different boundaries between adjacent cells. In some embodiments, it is desirable to estimate the boundary leakages of the semiconductor device 100 accurately based on the above differences.

Figure 2:
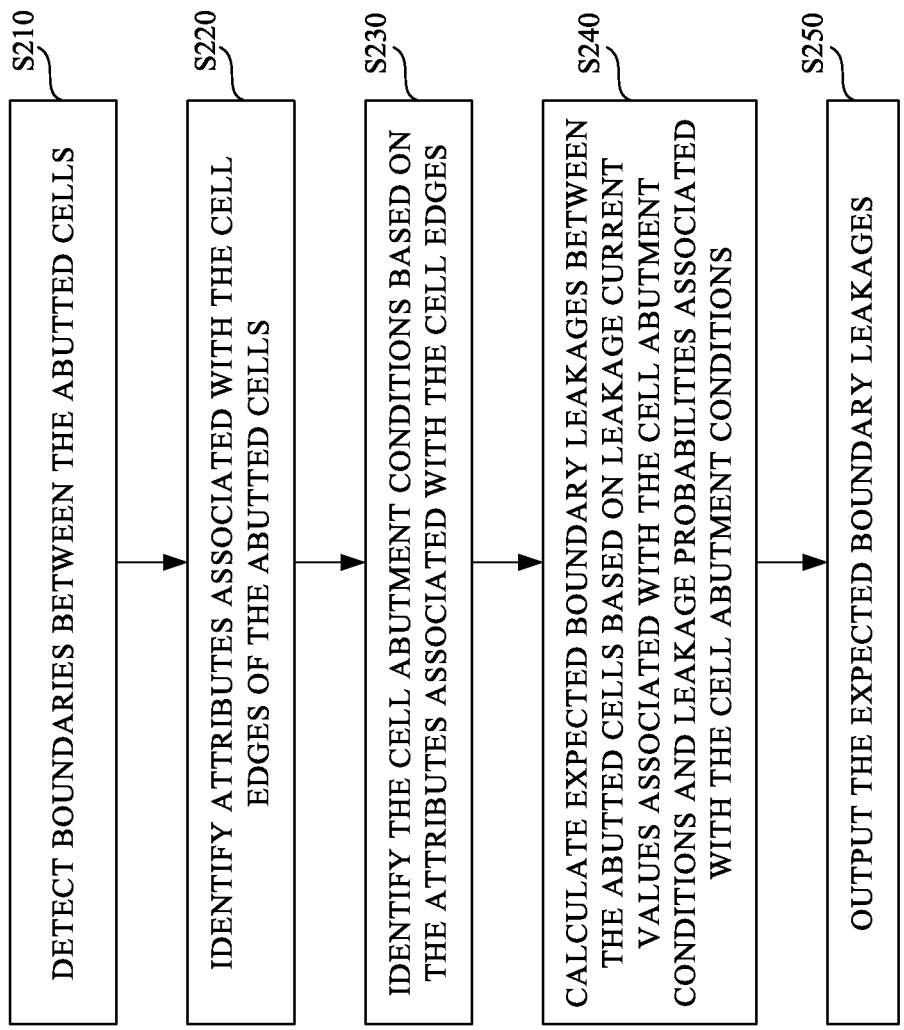
FIG. 2 is a flow chart illustrating a method for calculating cell abutment leakage in accordance with some embodiments.

FIG. 2 is a flow chart illustrating a method 200 for calculating cell abutment leakage in accordance with some embodiments. To aid with the understanding of the flow chart, the operations in FIG. 2 will be described with reference to FIG. 1. It should be understood that the method 200 can be applied to various layouts of the semiconductor device and is not limited to the embodiments of FIG. 1. In operation S210, the method 200 is utilized to detect boundaries between abutted cells in the layout of the semiconductor device 100. More particularly, for illustration in FIG. 1, the boundary BD1 is detected between the cells CL1 and CL2, and the cells CL1 and CL2 are abutted to each other around the boundary BD1. Similarly, the boundary BD2 is detected between the cells CL2 and CL3, and the cells CL2 and CL3 are abutted to each other around the boundary BD2.

In operation S220, the method 200 is utilized to identify attributes associated with cell edges of the abutted cells corresponding to each one of the boundaries BD1 and BD2. For example, the cell edges EG1c and EG1d of the cell CL1 and the cell edges EG2a and EG2b of the cell CL2 are identified corresponding to the boundary BD1, and the attributes of the cell edges EG1c, EG1d, EG2a and EG2b are considered in estimating the leakage currents L1p and L1n across the boundary BD1. Similarly, the cell edges EG2c and EG2d of the cell CL2 and the cell edges EG3a and EG3b of the cell CL3 are identified corresponding to the boundary BD2, and the attributes associated with cell edges EG2c, EG2d, EG3a and EG3b are considered in estimating the leakage currents L2p and L2n across the boundary BD2.

Figure 3B:
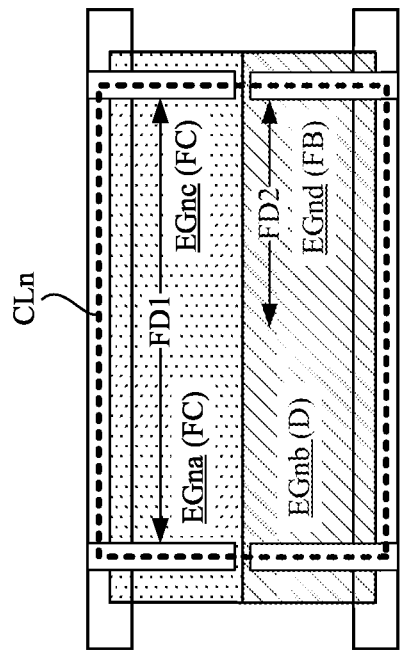
FIG. 3A and FIG. 3B illustrates examples of cell edges of one cell accordance with one or more embodiments.
Figure 3A:
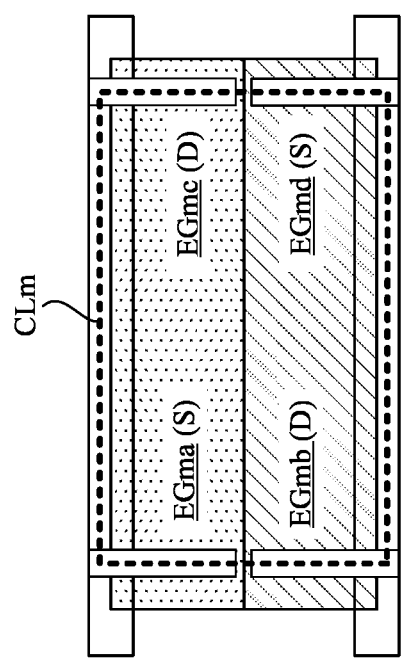

FIG. 3A illustrates an example of cell edges EGma-EGid of one cell CLm accordance with one or more embodiments. The cell CLm in FIG. 3A is an example to demonstrate any one of the cells CL1-CL3 in FIG. 1, and m is a positive integer. In an example shown in FIG. 3A, the cell edge EGma is utilized as a source terminal (S) in the cell CLm; the cell edge EGmb is utilized as a drain terminal (D) in the cell CLm; the cell edge EGmc is utilized as a drain terminal (D) in the cell CLm; and the cell edge EGmd is utilized as a source terminal (S) in the cell CLm.

FIG. 3B illustrates another example of cell edges EGna-EGnd of one cell CLn in accordance with one or more embodiments. The cell CLn in FIG. 3B is an example to demonstrate any one of the cells CL1-CL3 in FIG. 1, and n is a positive integer. In FIG. 3B, the cell edge EGna is utilized as a filler cell (FC) in the cell CLn; the cell edge EGnc is also utilized as a filler cell (FC) in the cell CLn; the cell edge EGnb is utilized as a drain terminal (D) in the cell CLn; and the cell edge EGnc is utilized as a filler break (FB) in the cell CLn.

In some embodiments, the filler cell (FC) or the filler break (FB) is formed in the cell CLn to keep the structure and/or layout of the semiconductor device 100 uniform and/or complete. In some other embodiments, the filler cell (FC) or the filler break (FB) is utilized to separate adjacent cells, in order to reduce leakages between the adjacent cells.

In FIG. 3B, the cell edges EGna and EGnc are both utilized as filler cells, and the cell edges EGna and EGnc have a filler depth FD1. In some embodiments, the filler depth FD1 is measured by an amount of fins arranging from the cell edge EGna to the cell edge EGnc. The cell edge EGnd is utilized as a filler break, and the cell edge EGnb is utilized as a drain terminal (D), and the cell edge EGnd has another filler depth FD2. In FIG. 3B, the filler depth FD1 is longer than the filler depth FD2 for illustration. In an example, the filler depth FD1 is "4" fin-widths and the filler depth FD2 is "2" fin-widths.

In FIG. 3A, all cell edges EGma-EGmd are utilized as functional terminals (e.g., drain terminals or source terminal) and not utilized as fillers. Alternatively stated, the filler depths of the cell edges EGma-EGmd are regarded as "0" fin-width.

The filler depths and the fin widths associated the filler cell (FC) or the filler break (FB), as discussed above, are given for illustrative purposes. Various filler depths and the fin widths associated the filler cell (FC) and the filler break (FB) are within the contemplated scope of the present disclosure. For example, in various embodiments, the filler depth of one filler cell (FC) is different from the filler depth of one filler break (FB).

In some embodiments, whether the cell edges (e.g., the cell edges EGma-EGmd of the cell CLm and the cell edges EGna-EGnd of the cell CLn) are utilized as drain (D), source (S), filler cell (FC) or filler break (FB) is decided according to functions (e.g., the cell CL1 is a AND gate, an OR gate, a NAND gate, a NOR gate, an XOR gate, an inverter, an on/off switch, a dummy spacer, a connection wiring) or designs (e.g., orientations or distributions of transistor terminals) of the cell CLm or CLn. In some embodiments, the attributes associated with the cell edges include terminal types (e.g., S, D, FC, FB) and/or filler depths of corresponding cell edges as illustratively shown in FIG. 3A and FIG. 3B.

In operation S230, the method 200 is utilized to identify cell abutment cases corresponding to each of the boundaries based on the attributes associated with the cell edges of the abutted cells. As illustratively shown in FIG. 3A and FIG. 3B, for illustration, the operation S230 is performed to identify cell abutment cases corresponding to each of the boundaries in FIG. 3A and FIG. 3B, and the cell edges of the abutted cells can be different terminal types and/or have different filler depths, such that there are various combinations of cell abutment cases related to different cell edges of the abutted cells.

Figure 4A:
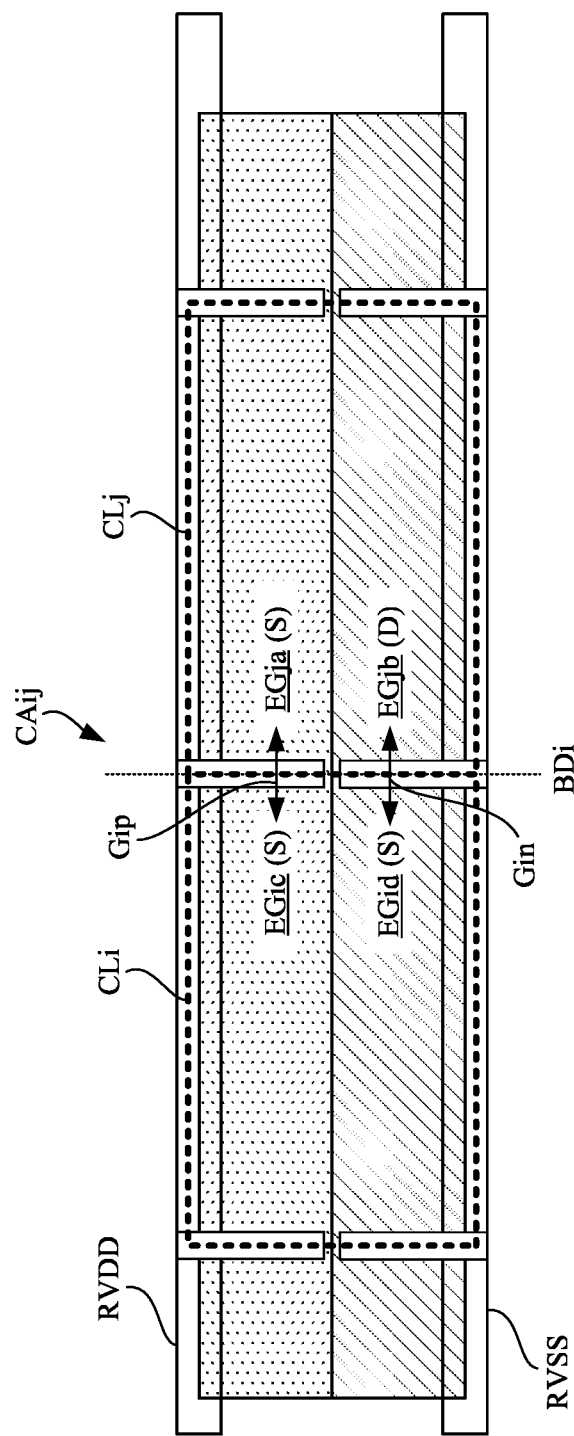
FIG. 4A and FIG. 4B illustrates examples of a cell abutment case corresponding to a boundary between abutted cells in accordance with one or more embodiments.

FIG. 4A illustrates an example of a cell abutment case CAij corresponding to a boundary BDi between abutted cells CLi and CLj in accordance with one or more embodiments. The cells CLi and CLj in FIG. 4A are illustrated as an example to demonstrate adjacent two of the cells CL1-CL3 in FIG. 1, and i and j are positive integers.

In an example illustratively shown in FIG. 4A, the boundary BDi between the cell CLi and the cell CLj includes a P-channel boundary portion Gip and an N-channel boundary portion Gin. The cell abutment case CAij corresponding to the boundary BDi includes an abutment type and a filler depth corresponding to the P-channel boundary portion Gip, and another abutment type and another filler depth corresponding to the N-channel boundary portion Gin. In the example illustratively shown in FIG. 4A, the cell abutment case CAij corresponding to the boundary BDi includes a source-to-source (S-S) abutment type of the cell edges EGic and EGja corresponding to the P-channel boundary portion Gip, a filler depth (which is, for example, "0" between the S-S abutment) corresponding to the P-channel boundary portion Gip, a source-to-drain (S-D) abutment type of the cell edges EGid and EGjb corresponding to the N-channel boundary portion Gin, another filler depth (which is, for example, "0" between the S-D abutment) corresponding to the N-channel boundary portion Gin.

Figure 4B:
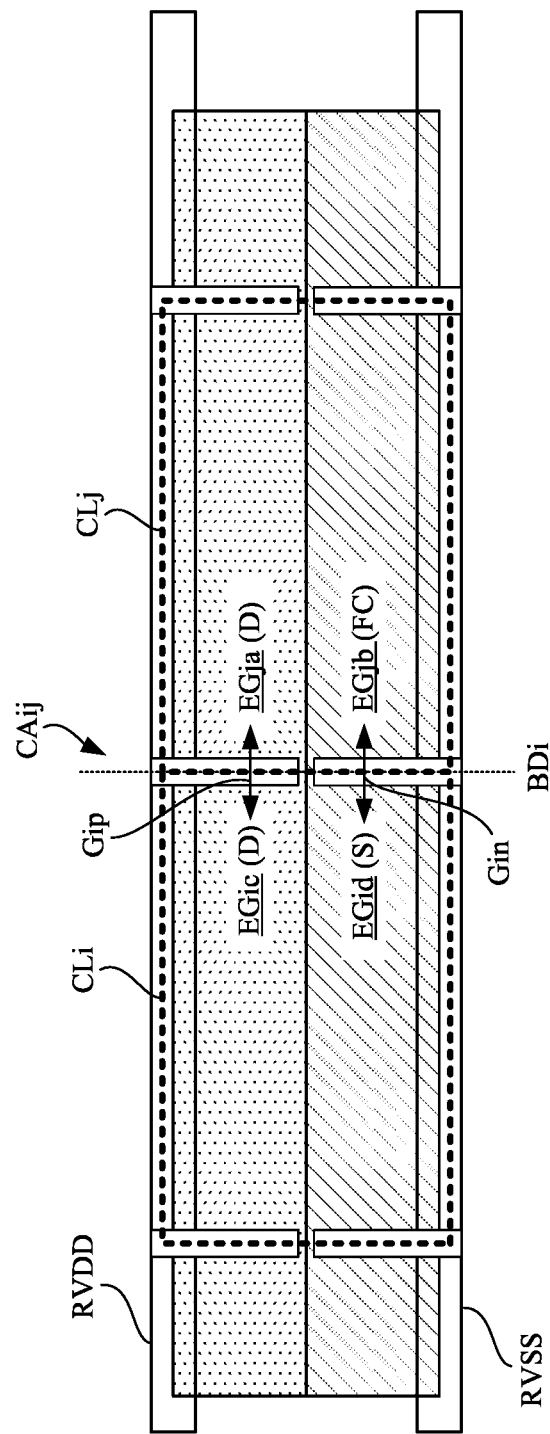

FIG. 4B illustrates another example of the cell abutment case CAij corresponding to the boundary BDi between the abutted cells CLi and CLj in accordance with one or more embodiments. The cells CLi and CLj in FIG. 4B are another example to demonstrate adjacent two of the cells CL1-CL3 in FIG. 1.

In an example illustratively shown in FIG. 4B, the boundary BDi between the cell CLi and the cell CLj includes a P-channel boundary portion Gip and an N-channel boundary portion Gin. For illustration, the cell abutment case CAij corresponding to the boundary BDi includes a drain-to-drain (D-D) abutment type of the cell edges EGic and EGja corresponding to the P-channel boundary portion Gip, a filler depth (which is, for example, "0" between the D-D abutment) corresponding to the P-channel boundary portion Gip, a source-to-fillercell (S-FC) abutment type of the cell edges EGid and EGjb corresponding to the N-channel boundary portion Gin, another filler depth (e.g., the filler depth of the filler cell is "4" fin-widths) corresponding to the N-channel boundary portion Gin.

Various abutment types S-S, S-D, D-D, S-FC are illustratively shown in aforesaid embodiments in FIG. 4A and FIG. 4B. The abutment types between two cell edges are not limited to examples in FIG. 4A and FIG. 4B. In various embodiments, the abutment type between two cell edges is selected from a combination of a source-source abutment (S-S), a drain-drain abutment (D-D), a source-drain abutment (S-D), a source-fillercell abutment (S-FC), a drain-fillercell abutment (D-FC), a source-fillerbreak abutment (S-FB) and a drain-fillerbreak abutment (D-FB).

Based on the above, operation S230 is performed to identify the cell abutment cases of each of the boundaries in the semiconductor device 100. For example, as illustratively shown in FIG. 1 and FIG. 2, the method 200 is utilized to identify one cell abutment case corresponding to the boundary BD1 between the abutted cells CL1 and CL2, and to identify another cell abutment case corresponding to the boundary BD2 between the abutted cells CL2 and CL3.

In operation S240, the method 200 is utilized to calculate expected boundary leakages between the abutted cells based on leakage current values and leakage probabilities associated with the cell abutment cases identified in operation S230. Details of operation S240 will be exemplarily discussed below with respect to FIGS. 5 and 6.

Figure 5:
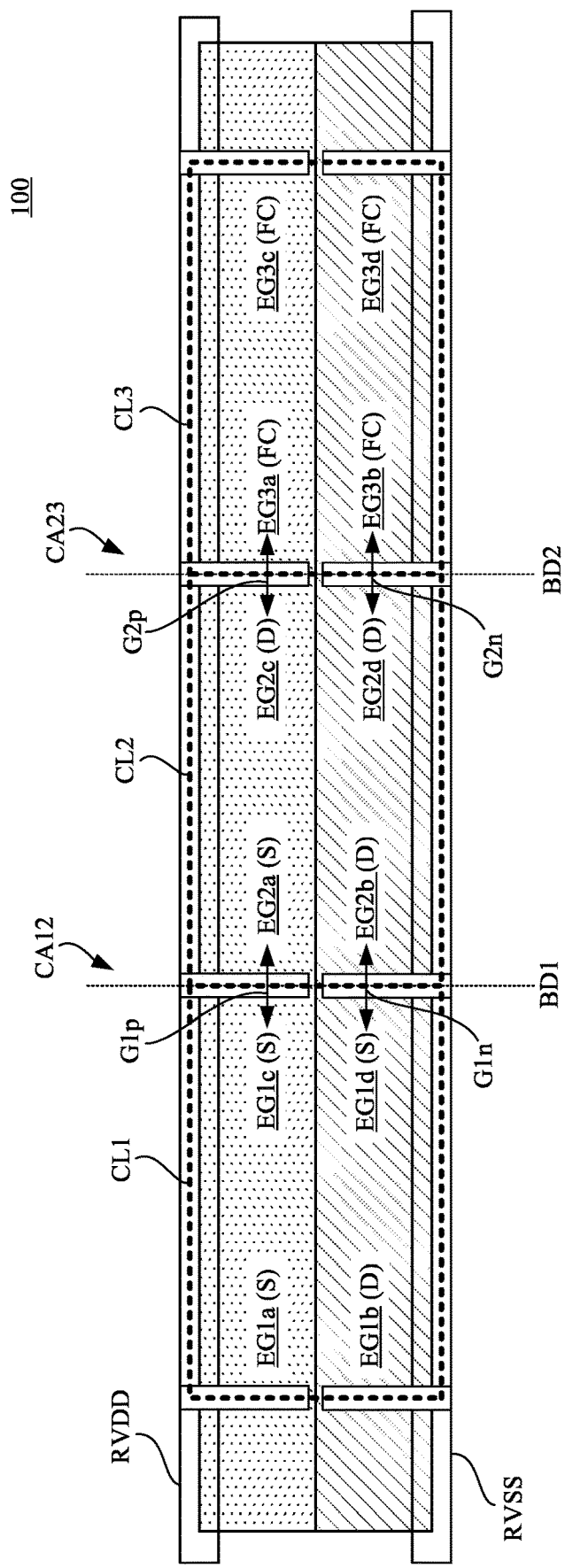
FIG. 5 is an exemplary case of the cell abutment cases of the semiconductor device in FIG. 1 in accordance with various embodiments of the present disclosure.
Figure 6:
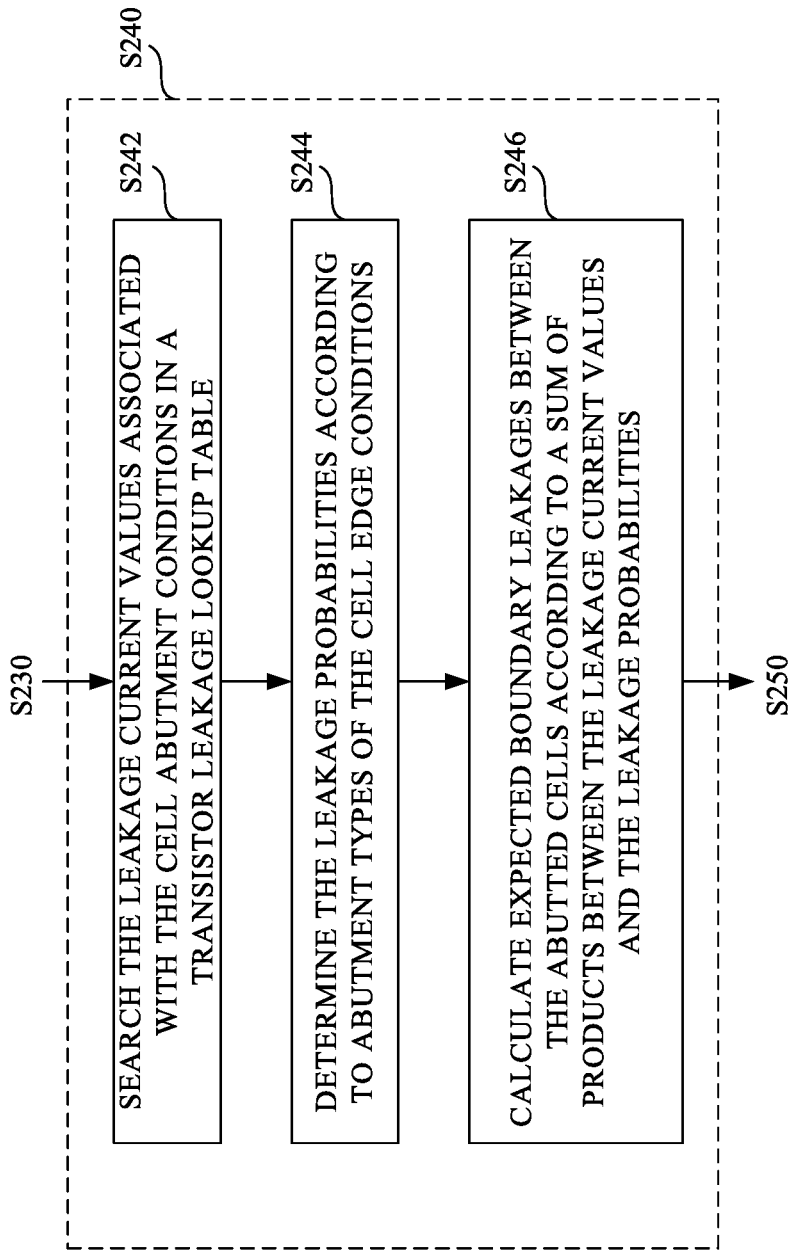
FIG. 6 is a flow chart illustrating further operations within one operation in FIG. 2, in accordance with some embodiments of the present disclosure.

FIG. 5 is an exemplary case of the cell abutment cases of the semiconductor device 100 in FIG. 1 in accordance with various embodiments of the present disclosure. A boundary leakage of the semiconductor device 100 in FIG. 5 is calculated according to the cell abutment cases, for example, by using operation S240 of the method illustrated in FIG. 2. FIG. 6 is a flow chart illustrating further operations S242-S246 within the operation S240 in FIG. 2, in accordance with some embodiments of the present disclosure.

As illustratively shown in FIG. 6, the operation S240 in FIG. 2 includes operations S242-S246 for calculating expected boundary leakages between the abutted cells, which will be exemplarily discussed below with more details.

In the example illustratively shown in FIG. 5, the cell abutment case CA12 corresponding to the boundary BD1 includes a source-to-source (S-S) abutment type of the cell edges EG1c and EG2a corresponding to the P-channel boundary portion G1p, a filler depth "0" corresponding to the P-channel boundary portion G1p, a source-to-drain (S-D) abutment type of the cell edges EG1d and EG2b corresponding to the N-channel boundary portion G1n, another filler depth "0" corresponding to the N-channel boundary portion G1n. In other words, the cell abutment case CA12 includes information represented as [G1p: S-S, 0 and G1n: S-D, 0].

In operation S242, the method is performed to search in a transistor leakage lookup table for leakage current values corresponding to the P-channel boundary portion G1p and the N-channel boundary portion G1n in cell abutment case CA12 at the boundary BD1. The transistor leakage lookup table will be exemplarily discussed below with reference to FIG. 7A.

FIG. 7A is an exemplary case of a transistor leakage lookup table LUT1 in accordance with various embodiments of the present disclosure. For example, in some embodiments, the leakage information in the transistor leakage lookup table LUT1 is obtained via simulation of different filler depths and/or different abutment conditions (e.g., S-S, D-D, D-S abutments) and/or different MOS types. The results of the simulation may provide information about the leakage for various types of cell boundaries. For illustration, the transistor leakage lookup table LUT1 is a simulation result of the leakage current values of the abutted cells, which are manufactured with a low voltage threshold (LVT) process.

In operation S242, the leakage current values corresponding to the P-channel boundary portion G1p on the boundary BD1 as shown in FIG. 5 will be determined as "70" μA according to the third row of the transistor leakage lookup table LUT1, i.e., P-channel, filler depth=0, and the edge type involves normal terminals (S or D). The leakage current values corresponding to the N-channel boundary portion G1n on the boundary BD1 will be determined as "40" μA according to the second row of the transistor leakage lookup table LUT1, i.e., N-channel, filler depth=0, and the edge type involves normal terminals (S or D).

In the example illustratively shown in FIG. 5, the cell abutment case CA23 corresponding to the boundary BD2 includes a drain-to-filler (D-FC) abutment type of the cell edges EG2c and EG3a corresponding to the P-channel boundary portion G2p, a filler depth of "4" fin-widths corresponding to the P-channel boundary portion G2p, a drain-to-filler (D-FC) abutment type of the cell edges EG2d and EG3b corresponding to the N-channel boundary portion G2n, another filler depth of "4" fin-widths corresponding to the N-channel boundary portion G2n. In other words, the cell abutment case CA12 includes information represented as [G2p: D-FC, 4 and G2n: D-FC, 4].

In operation S242, the method is performed to search in the transistor leakage lookup table LUT1 for leakage current values corresponding to the P-channel boundary portion G2p and the N-channel boundary portion G2n in the cell abutment case CA23 at the boundary BD2.

In operation S242, the leakage current values corresponding to the P-channel boundary portion G2p on the boundary BD2 as shown in FIG. 5 will be determined as "3" μA according to the fifth row of the transistor leakage lookup table LUT1, i.e., P-channel, filler depth=4, and the edge type involves a filler cell (FC). The leakage current values corresponding to the N-channel boundary portion G2n on the boundary BD2 will be determined as "2" μA according to the fourth row of the transistor leakage lookup table LUT1, i.e., N-channel, filler depth=4, and the edge type involves a filler cell (FC).

FIG. 7B is an exemplary case of a leakage probability lookup table LUT2 in accordance with various embodiments of the present disclosure. In some embodiments, the leakage probability lookup table LUT2 reflects different leakage probabilities under different combinations of abutment types. As shown in FIG. 7B, the leakage probability lookup table LUT2 records the leakage probabilities under a source-source abutment (S-S), a drain-drain abutment (D-D), a source-drain abutment (S-D), a source-filler abutment (S-FC), a drain-filler abutment (D-FC), a source-fillerbreak abutment (S-FB) and a drain-fillerbreak abutment (D-FB) respectively.

The following table 1 shows possible combination of voltage levels on two cell edges, and edge types of these two cell edges are both source terminals (S).

TABLE 1

|  | Cell Edge 1 (S) | Cell Edge 2 (S) | Leakage |
| --- | --- | --- | --- |
| Voltage Level | 0 | 0 | NO |
| Voltage Level | 1 | 1 | NO |

As illustratively shown in Table 1, when two abutted cell edges are both source terminals, both of the voltage levels of the cell edges (S-S) are fixed at logic "0" (e.g., a low system level VSS) for a N-channel transistor, or both of the voltage levels of the cell edges are fixed at logic "1" (e.g., a high system level VDD) for a P-channel transistor. Therefore, there is no voltage difference between the abutted cell edges when the abutment type is the source-source abutment (S-S). Accordingly, as illustratively shown in FIG. 7B, the leakage probability of the source-source abutment (S-S) is 0 because of no voltage difference between the abutted cell edges.

The following table 2 shows possible combination of voltage levels on two cell edges, in which an edge type of one cell edge is a drain terminal (D) and an edge type of the other cell edge is a drain terminal (D), a source terminal (S), a filler cell (FC) or a filler break (FB). A voltage level of the filler cell (FC) or filler break (FB) is affected by an adjacent terminal coupled with the filler cell (FC) or filler break (FB). In some embodiments, the filler cell (FC) or filler break (FB) is coupled to a source terminal. Therefore, the voltage level of the filler cell (FC) or filler break (FB) is assumed to vary or operate like a source terminal in some situations.

TABLE 2

|  | Cell Edge 1 (D) | Cell Edge 2 (D, S, FC or FB) | Leakage |
| --- | --- | --- | --- |
| Voltage Level | 0 | 0 | NO |
| Voltage Level | 0 | 1 | YES |
| Voltage Level | 1 | 0 | YES |
| Voltage Level | 1 | 1 | NO |

As illustratively shown in Table 2, when an edge type of one cell edge is a drain terminal (D) and an edge type of the other cell edge is a drain terminal (D), a source terminal (S), a filler cell (FC) or a filler break (FB), both of the voltage levels of the cell edges will be varied between the logic "0" (e.g., a low system level VSS) and the logic "1" (e.g., a high system level VDD). Therefore, the leakage probabilities of the drain-drain abutment (D-D), the source-drain abutment (S-D), the source-filler abutment (S-FC), the drain-filler abutment (D-FC), the source-fillerbreak abutment (S-FB) and the drain-fillerbreak abutment (D-FB) is 0.5 (i.e., 50%), as shown in FIG. 7B.

FIG. 8 is an exemplary case of a calculation table CAL1 of the boundary leakage related to the layout of the semiconductor device 100 in embodiments illustrated in FIG. 5. With reference to FIG. 5, FIG. 6, FIG. 7A and FIG. 8, the leakage current values from the transistor leakage lookup table LUT1 (corresponding to the cell abutment case CA12 at the boundary BD1 and the cell abutment case CA23 at the boundary BD2) are filled into the fifth column of the calculation table CAL1 of FIG. 8.

In operation S244, the method is performed to determine the leakage probabilities associated with the cell abutment cases CA12 and CA23 respectively. The operation of determining leakage probabilities will be exemplarily discussed below with reference to FIG. 7B.

With reference to FIG. 5, FIG. 6, FIG. 7B and FIG. 8, in operation S244, the leakage probabilities from the leakage probability lookup table LUT2 (corresponding to the cell abutment case CA12 at the boundary BD1 and the cell abutment case CA23 at the boundary BD2) are filled into the sixth column of the calculation table CAL1 of FIG. 8.

With reference to FIG. 5, FIG. 6 and FIG. 8, in operation S246, the method is performed to calculate expected boundary leakages between the abutted cells according to a sum of products between the leakage current values and the leakage probabilities. More particularly, for illustration, the expected boundary leakage across the P-channel boundary portion G1p of the cell abutment case CA12 equals to 70×0=0 μA. The expected boundary leakage across the N-channel boundary portion G1n of the cell abutment case CA12 equals to 40×0.5=20 μA. Therefore, the expected boundary leakages of the cell abutment case CA12 are 0+20=20 μA. Similarly, the expected boundary leakage across the P-channel boundary portion G2p of the cell abutment case CA23 equals to 3×0.5=1.5 µA. The expected boundary leakage across the N-channel boundary portion G2n of the cell abutment case CA23 equals to 2×0.5=1 µA. Therefore, the expected boundary leakages of the cell abutment cases CA12 and CA23 of the semiconductor device 100 in FIG. 5 are 1.5+1=2.5 µA.

It should be understood that there can be more cell abutment cases associated with boundaries between more cells (not shown in FIG. 5) of semiconductor device 100. Total expected boundary leakages of the semiconductor device 100 should be estimated according to all cell abutment cases found in the layout of the semiconductor device 100. The cell abutment cases CA12 and CA23 illustratively shown in FIG. 5 are given for illustrative purposes.

Based on aforesaid embodiments illustratively shown in FIG. 1, FIG. 2, FIG. 6, FIG. 7A, FIG. 7B and FIG. 8, the expected boundary leakages across the boundary BD1 can be calculated according to the information/attributes about the cell abutment case CA12; and the expected boundary leakages across the boundary BD2 can be calculated according to the information/attributes about the cell abutment case CA23. Therefore, based on the information/attributes about all cell abutment cases between abutted cells in the semiconductor device 100 in FIG. 1, a total amount of the expected boundary leakages of the semiconductor device 100 can be estimated accurately. With the accurate estimation of total amount of the expected boundary leakages of the semiconductor device 100, designing the layout of the semiconductor device 100 can be improved.

In operation S250 in FIG. 2, the expected boundary leakages of the semiconductor device 100 are outputted as a notification to a display, and/or as a leakage report to a printer or a storage medium. The expected boundary leakages of the semiconductor device 100 are helpful information to a designer or a computer-aided automatic design tool of the layout of the semiconductor device 100.

In some embodiments, an optimization tool can avoid cell abutment with more leakage probability and displace cell abutment to other location for reducing the expected boundary leakages. Based on aforesaid method 200 in FIG. 2 and FIG. 5, the method 200 is not required to establish a simulation of all cells in the layout and perform analysis to calculate the leakages in all simulated cells. In other words, the method 200 can perform a context-based boundary leakage analysis without completing the simulation of all cells in the layout.

In aforesaid embodiments illustratively shown in FIG. 6, FIG. 7A, FIG. 7B and FIG. 8, the expected boundary leakages are calculated under a condition that the cells CL1-CL3 are manufactured with a low voltage threshold (LVT) process. It should be understood that the method 200 can be applied to various layouts of the semiconductor device manufactured with different process, such as a standard voltage threshold (SVT) process, a low voltage threshold (LVT) process, or an ultra-low voltage threshold (uLVT) process.

Figure 9:
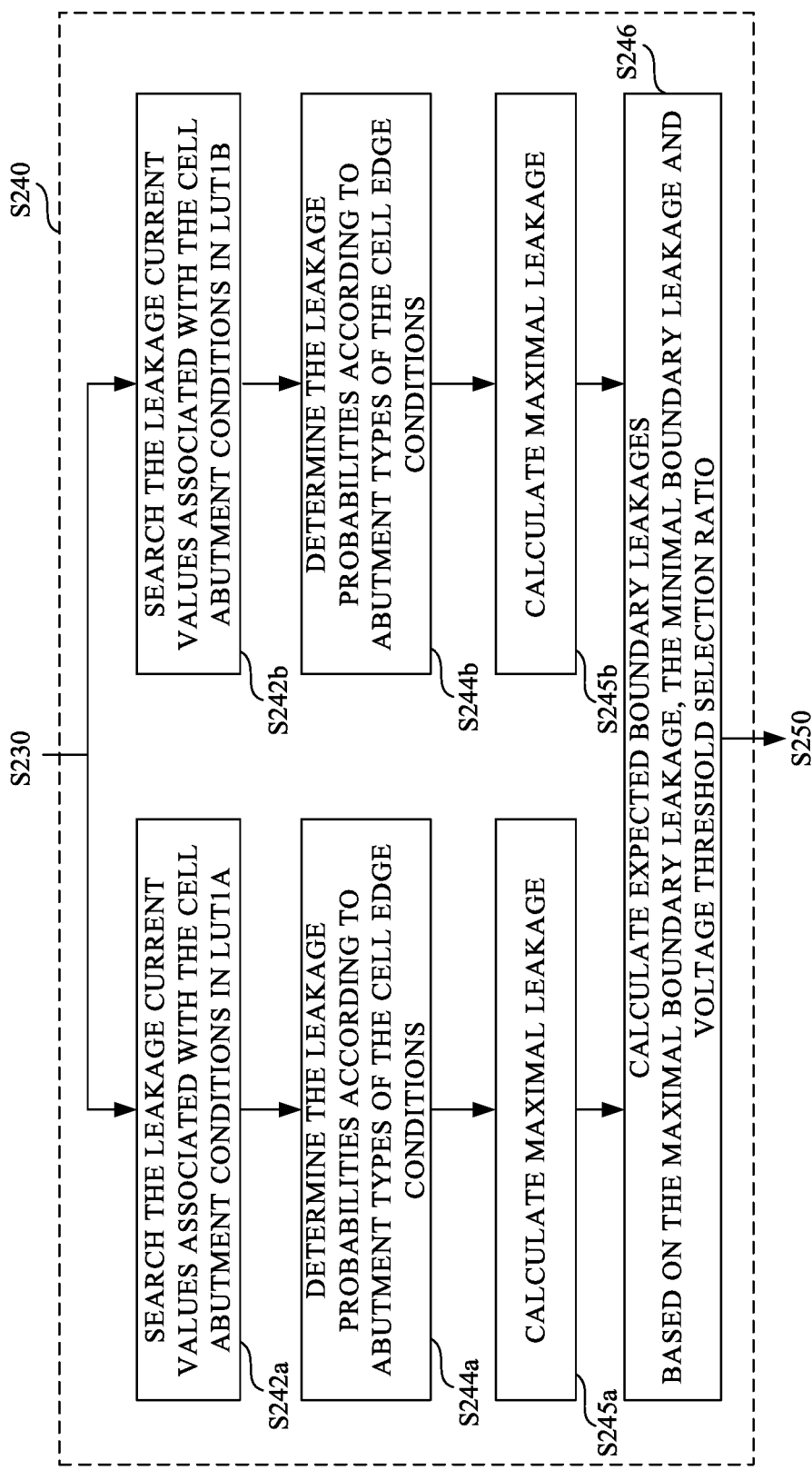
FIG. 9 is another flow chart illustrating further operations within one operation in FIG. 2, in accordance with some embodiments of the present disclosure.

FIG. 9 is another flow chart illustrating further operations S242a, S242b, S244a, S244b, S245a, S245b and S246 within the operation S240 in FIG. 2, in accordance with various embodiments of the present disclosure. As illustratively shown in FIG. 9, the operation S240 in FIG. 2 includes operations S242a, S242b, S244a, S244b, S245a, S245b and S246 for calculating expected boundary leakages between the abutted cells.

For illustration, operations S242a, S242b, S244a, S244b, S245a, S245b and S246 in FIG. 9 can be applied to calculate the expected boundary leakages of the layout illustratively shown in FIG. 5, which will be exemplarily discussed below with more details.

With reference to FIG. 5 and FIG. 9, in operation S242a, the method is performed to search in a transistor leakage lookup table related to the low voltage threshold (LVT) process for leakage current values corresponding to the P-channel boundary portion G1p and the N-channel boundary portion G1n in cell abutment case CA12 at the boundary BD1. Such a transistor leakage lookup table will be exemplarily discussed below with reference to FIG. 10A.

FIG. 10A is an exemplary case of the transistor leakage lookup table LUT1A in accordance with various embodiments of the present disclosure. For example, in some embodiments, the leakage information in the transistor leakage lookup table LUT1A is obtained via simulation of different filler depth and/or different abutment conditions (e.g., S-S, D-D, D-S abutments) and/or different MOS types. The results of the simulation may provide information about the leakage for various types of cell boundaries. For illustration, the transistor leakage lookup table LUT1A is a simulation result of the leakage current values of the abutted cells, which are manufactured with a low voltage threshold (LVT) process.

In operation S242a, the leakage current values corresponding to the P-channel boundary portion G1p on the boundary BD1 will be determined as "70" µA according to the third row of the transistor leakage lookup table LUT1A, i.e., P-channel, filler depth=0, and the edge type involves normal terminals (S or D). The leakage current values corresponding to the N-channel boundary portion G1n on the boundary BD1 will be determined as "40" µA according to the second row of the transistor leakage lookup table LUT1A, i.e., N-channel, filler depth=0, and the edge type involves normal terminals (S or D).

With reference to FIG. 5 and FIG. 9, in operation S242b, the method is performed to search in a transistor leakage lookup table related to the standard voltage threshold (SVT) process for leakage current values corresponding to the P-channel boundary portion G1p and the N-channel boundary portion G1n in cell abutment case CA12 at the boundary BD1. The standard voltage threshold (SVT) is higher than the low voltage threshold (LVT). Such a transistor leakage lookup table will be exemplarily discussed below with reference to FIG. 10B.

FIG. 10B is an exemplary case of another transistor leakage lookup table LUT1B in accordance with various embodiments of the present disclosure. For example, in some embodiments, the leakage information in the transistor leakage lookup table LUT1B may be obtained via simulation of different filler depth and/or different abutment conditions (e.g., S-S, D-D, D-S abutments) and/or different MOS types. The results of the simulation may provide information about the leakage for various types of cell boundaries. For illustration, the transistor leakage lookup table LUT1B is a simulation result of the leakage current values of the abutted cells, which are manufactured with a standard voltage threshold (SVT) process.

In operation S242b, the leakage current values corresponding to the P-channel boundary portion G1p on the boundary BD1 will be determined as "7" µA according to the third row of the transistor leakage lookup table LUT1, i.e., P-channel, filler depth=0, and the edge type involves normal terminals (S or D). The leakage current values corresponding to the N-channel boundary portion G1n on the boundary BD1 will be determined as "4" µA according to the second row of the transistor leakage lookup table LUT1, i.e., N-channel, filler depth=0, and the edge type involves normal terminals (S or D).

Similarly, in operation S242a, the method is performed to search in the transistor leakage lookup table LUT1A for leakage current values corresponding to the P-channel boundary portion G2p and the N-channel boundary portion G2n in the cell abutment case CA23 at the boundary BD2 corresponding to the low voltage threshold (LVT).

Similarly, in operation S242a, the method is performed to search in the transistor leakage lookup table LUT1B for leakage current values corresponding to the P-channel boundary portion G2p and the N-channel boundary portion G2n in the cell abutment case CA23 at the boundary BD2 corresponding to the standard voltage threshold (SVT).

FIG. 11 is an exemplary case of a leakage probability lookup table LUT2 in accordance with various embodiments of the present disclosure. In some embodiments, the leakage probability lookup table LUT2 reflects different leakage probabilities under different combinations of abutment types. As shown in FIG. 11, the leakage probability lookup table LUT2 records the leakage probabilities under a source-source abutment (S-S), a drain-drain abutment (D-D), a source-drain abutment (S-D), a source-filler abutment (S-FC), a drain-filler abutment (D-FC), a source-fillerbreak abutment (S-FB) and a drain-fillerbreak abutment (D-FB) respectively.

As illustratively shown in FIG. 11, the leakage probability of the source-source abutment (S-S) is 0, and the leakage probabilities of the drain-drain abutment (D-D), the source-drain abutment (S-D), the source-filler abutment (S-FC), the drain-filler abutment (D-FC), the source-fillerbreak abutment (S-FB) and the drain-fillerbreak abutment (D-FB) is 0.5 (i.e., 50%). The leakage probabilities about these abutment types are explained in aforesaid embodiment in FIG. 7B, and not repeated here.

FIG. 12 is an exemplary case of a calculation table CAL2 of the boundary leakage related to the layout of the semiconductor device 100 in the embodiments illustrated in FIG. 5. With reference to FIG. 5, FIG. 9, FIG. 10A, FIG. 10B and FIG. 12, the leakage current values from the transistor leakage lookup table LUT1A (corresponding to the cell abutment case CA12 at the boundary BD1 and the cell abutment case CA23 at the boundary BD2) under a first possible voltage threshold VT1 (VT1=LVT in this embodiment) are filled into the fourth column of the calculation table CAL2. The leakage current values from the transistor leakage lookup table LUT1B (corresponding to the cell abutment case CA12 at the boundary BD1 and the cell abutment case CA23 at the boundary BD2) under a second possible voltage threshold VT2 (VT2=SVT in this embodiment) are filled into the sixth column of the calculation table CAL2.

In operation S244a, the method is performed to determine the leakage probabilities associated with the cell abutment cases CA12 and CA23 under the first possible voltage threshold VT1 (VT1=LVT in this embodiment) respectively. In operation S244b, the method determines the leakage probabilities associated with the cell abutment cases CA12 and CA23 under the second possible voltage threshold VT2 (VT2=SVT in this embodiment) respectively.

With reference to FIG. 5, FIG. 9 and FIG. 12, in operation S245a, the method is performed to calculate maximal leakages between the abutted cells according to a sum of products between the leakage current values and the leakage probabilities in response to that the abutted cells are manufactured with the low voltage threshold (i.e., VT1 in this embodiment) process.

In response to that the cells CL1, CL2 and CL3 and the boundary gates are manufactured with a higher level of voltage threshold, the leakage currents of the cells and boundaries between cells will be reduced, and in the meantime, sizes occupied by the cells will be larger and also power consumption of the cells will be higher. When the cells CL1, CL2 and CL3 and the boundary gates are manufactured with a lower level of voltage threshold, the leakage currents of the cells and boundaries between cells will be higher, and in the meantime, sizes occupied by the cells can be reduced and also power consumption of the cells will be lower. For illustration, the cells CL1, CL2 and CL3 and the boundary gates (e.g., TG1p, TG1n, TG2p, TG2n, TG3p, TG3n in FIG. 1) in this embodiment are possible to be manufactured with the low voltage threshold process (LVT) and the low voltage threshold process (SVT) for demonstration. Therefore, in these embodiments, the maximal leakages can be calculated in response to that the abutted cells are manufactured with the low voltage threshold (i.e., VT1 in this embodiment) process. Similar, in these embodiments, the minimal leakages can be calculated in response to that the abutted cells are manufactured with the standard voltage threshold (i.e., VT2 in this embodiment) process.

It should be understood that the method 200 can be applied to various voltage thresholds, such as the standard voltage threshold (SVT) process, the low voltage threshold (LVT) process, or the ultra-low voltage threshold (uLVT) process. In some embodiments, the maximal leakages can be calculated in response to that the abutted cells are manufactured with the lowest one of all possible voltage thresholds. Similar, the minimal leakages can be calculated in response to that the abutted cells are manufactured with the highest one of all possible voltage thresholds.

More particularly, in operation S245a, the maximal leakage across the P-channel boundary portion G1p of the cell abutment case CA12 equals to 70×0=0 μA. The maximal leakage across the N-channel boundary portion G1n of the cell abutment case CA12 equals to 40×0.5=20 μA. Therefore, the maximal leakages of the cell abutment case CA12 are 0+20=20 μA. Similarly, the maximal leakage across the P-channel boundary portion G2p of the cell abutment case CA23 equals to 3×0.5=1.5 μA. The maximal leakage across the N-channel boundary portion G2n of the cell abutment case CA23 equals to 2×0.5=1 μA. Therefore, the maximal leakage of the cell abutment case CA23 of the semiconductor device 100 in FIG. 5 are 1.5+1=2.5 μA. In sum, the maximal leakages of the cell abutment cases CA12 and CA23 of the semiconductor device 100 in FIG. 5 are 22.5 μA.

In operation S245b, the method calculates minimal leakages between the abutted cells according to a sum of products between the leakage current values and the leakage probabilities in response to that the abutted cells are manufactured with the standard voltage threshold (i.e., VT2 in this embodiment) process.

More particularly, in operation S245b, the minimal leakage across the P-channel boundary portion G1p of the cell abutment case CA12 equals to 7×0=0 μA. The minimal leakage across the N-channel boundary portion G1n of the cell abutment case CA12 equals to 4×0.5=2 μA. Therefore, the minimal leakages of the cell abutment case CA12 are 0+2=2 μA. Similarly, the minimal leakage across the P-channel boundary portion G2p of the cell abutment case CA12 equals to 0.3×0.5=0.15 μA. The minimal leakage across the N-channel boundary portion G2n of the cell abutment case CA23 equals to 0.2×0.5=0.1 μA. Therefore, the minimal leakage of the cell abutment cases CA23 are 1.5+1=0.25 μA. In sum, the minimal leakages of the cell abutment cases CA12 and CA23 of the semiconductor device 100 in FIG. 5 are 2.25 μA.

It should be understood that there can be more cell abutment cases located at boundaries between more cells (not shown in FIG. 5) of semiconductor device 100. Maximal/minimal boundary leakages of the semiconductor device 100 should be estimated according all cell abutment cases found in the layout of the semiconductor device 100.

With reference to FIG. 5, FIG. 9 and FIG. 12, in operation S246, the method is performed to calculate expected boundary leakages of the cell abutment cases in the semiconductor device 100 based on the maximal boundary leakage, the minimal boundary leakage and a voltage threshold selection ratio.

In some embodiments, the voltage threshold selection ratio is a percentage indicating a possibility that the lower voltage threshold (LVT) will be selected rather than the standard voltage threshold (SVT) by a voltage threshold selection tool. More particularly, in the embodiment shown in FIG. 12, the voltage threshold selection ratio is assumed to be 0.25, which means there is 25% of possibility that the lower voltage threshold (LVT) will be applied to the cells CL1-CL3, and 75% of possibility that the standard voltage threshold (SVT) will be applied to the cells CL1-CL3.

In a semiconductor manufacturing business, the algorithm about how to select/decide the voltage thresholds for cells in the layout is usually a trade secret, which a semiconductor manufacturing company does not share with outsiders. Without knowing the voltage thresholds applied to the cells in the layout, it will be hard for the designer of the circuit layout to estimate the internal leakage currents and the boundary leakage currents of the layout design. Sometimes, the designer has to perform a voltage threshold selection/simulation tool to assign the voltage thresholds for cells in the layout first, and then the internal leakage currents and the boundary leakage currents of the layout design can be estimated afterwards. It takes a lot of time during the designing process waiting for the voltage threshold selection/simulation tool to complete the assignment. If the layout has been amended, it has to launch the voltage threshold selection/simulation tool to do the assignment again.

In these embodiments, the method provides an alternative way to estimate the internal leakage currents and the boundary leakage currents of the layout design based on the maximal boundary leakage, the minimal boundary leakage and the voltage threshold selection ratio, without disclosing the algorithm about how to select/decide the voltage thresholds for cells.

In some embodiments, for the cell abutment case CA12 and CA23, the expected boundary leakages are calculated by:

maximal boundary leakage×voltage threshold selection ratio+minimal boundary leakage×(1-voltage threshold selection ratio)

More particularly, the expected boundary leakages of cell abutment case CA12 in embodiments of FIG. 5 and FIG. 12 can be calculated as 20×0.25+2×0.75=6.5 μA. More particularly, the expected boundary leakages of cell abutment case CA23 in embodiments of FIG. 5 and FIG. 12 can be calculated as 2.5×0.25+0.25×0.75=0.8125 μA. In sum, the expected boundary leakages of the cell abutment cases CA12 and CA23 of the semiconductor device 100 in FIG. 5 are 7.3125 μA. It should be understood that there can be more cell abutment cases located at boundaries between more cells (not shown in FIG. 5) of semiconductor device 100. The expected boundary leakages of the semiconductor device 100 should be estimated according all cell abutment cases found in the layout of the semiconductor device 100.

In operation S250 in FIG. 2, the expected boundary leakages of the semiconductor device 100 are outputted as a notification to a display, and/or as a leakage report to a printer or a storage medium. The expected boundary leakages of the semiconductor device 100 are helpful information to a designer or a computer-aided automatic design tool of the layout of the semiconductor device 100.

Based on aforesaid embodiments, the maximal boundary leakages, the minimal boundary leakages and the expected boundary leakages of the semiconductor device 100 are all calculated. The information is helpful in estimating power efficiency of the layout of the semiconductor device 100. Based on the information, the designer or a computer-aided automatic design tool can acknowledge an upper bound, a lower bound and an expected value of the boundary leakages of the semiconductor device 100. In this case, the designer or the computer-aided automatic design tool can adjust the layout design accordingly.

Figure 13:
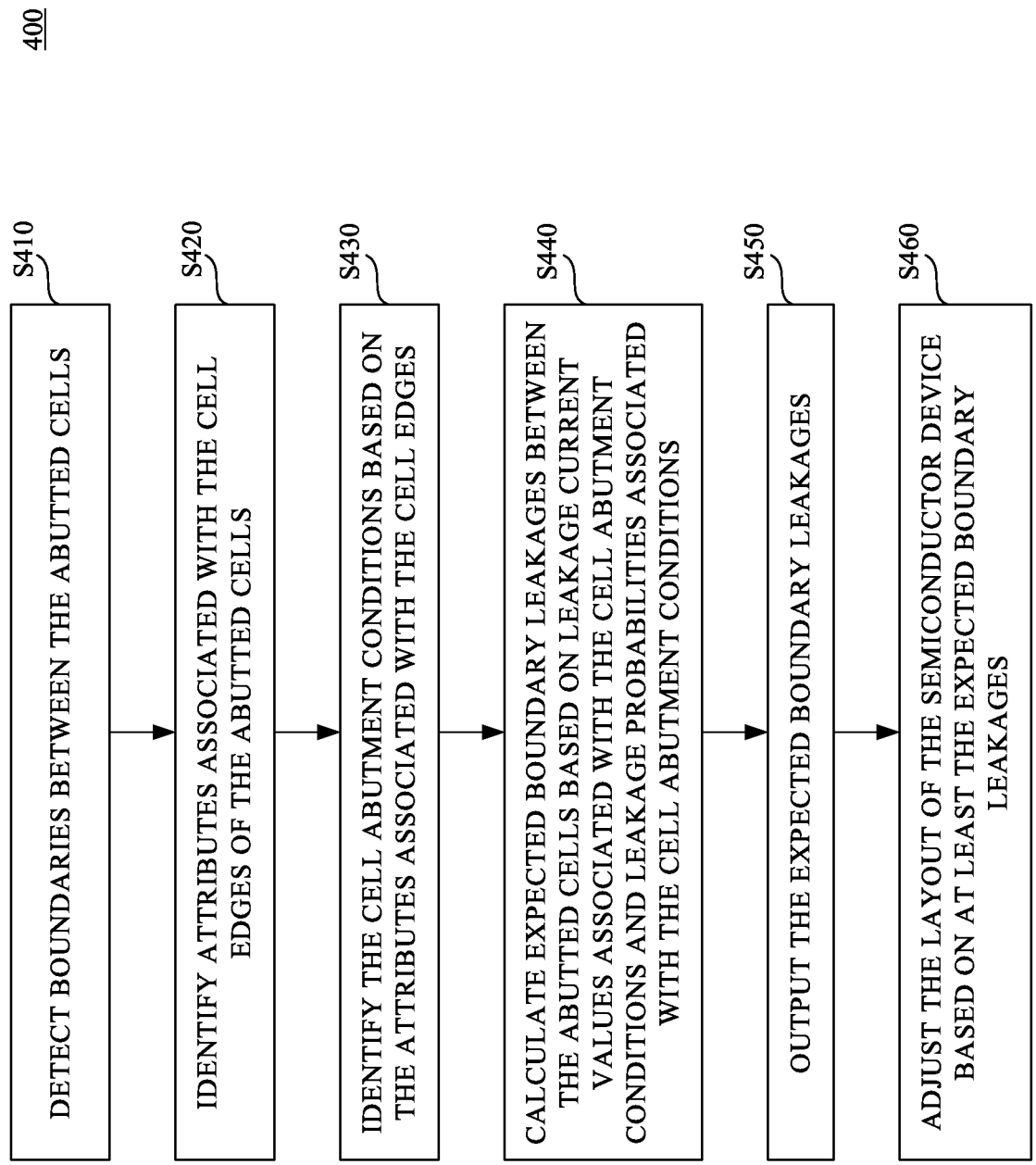
FIG. 13 is a flow chart of a method for designing a layout of a semiconductor device in accordance with some embodiments of the present disclosure.

FIG. 13 is a flow chart of a method 400 for designing a layout of a semiconductor device (e.g., the semiconductor device 100 in FIG. 1 and FIG. 5) in accordance with some embodiments of the present disclosure. As illustratively shown in FIG. 13, the method 400 includes operations S410, S420, S430, S440, S450 and S460. Among these operations, operations S410-S450 in embodiments of FIG. 13 are similar to the operation S210-S250 in the embodiments of FIG. 2 (along with FIG. 6 and FIG. 9) and are not repeated here for sake of brevity. After the expected boundary leakages (and/or the maximal/minimal boundary leakages) of the semiconductor device 100 are calculated, operation S460 is executed to adjust the layout of the semiconductor device 100 based on at least the expected boundary leakages.

Figure 14:
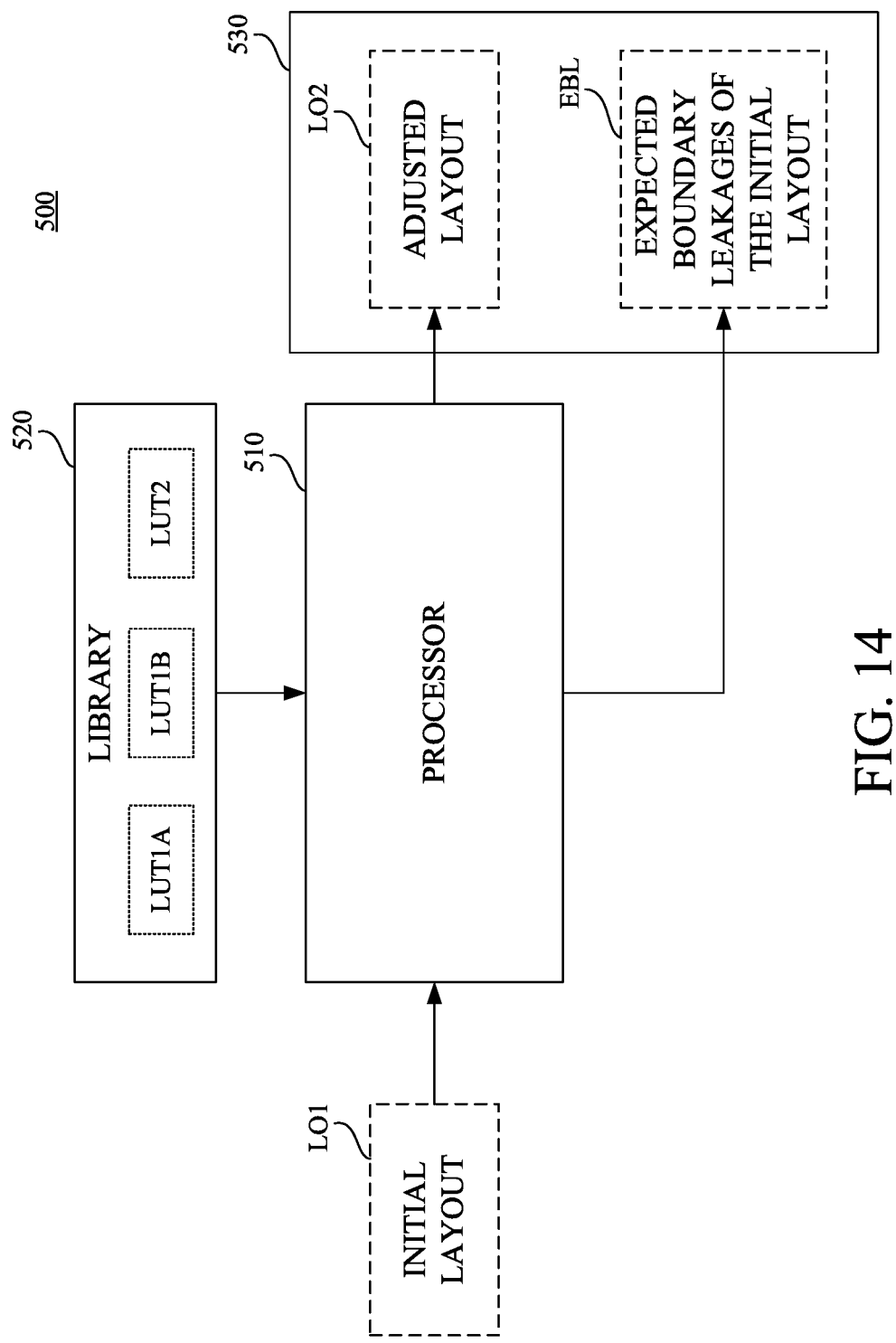
FIG. 14 is a block diagram of a computer system employed to perform the method illustrated in FIG. 2 or the method illustrated in FIG. 13, in accordance with some embodiments of the present disclosure.

FIG. 14 is a block diagram of a computer system 500, for illustration, employed to perform the method 200 illustrated in FIG. 2 or the method 400 illustrated in FIG. 13, in accordance with some embodiments of the present disclosure. The computer system 500 is able to calculate boundary leakage in an initial layout LO1 of a semiconductor device (e.g., the semiconductor device 100 in FIG. 1 and FIG. 5). The computer system 500 includes a processor 510, a library 520 and an output interface 530. In some embodiments, the processor 510 can be a central processing unit, an Application-specific integrated circuit (ASIC), a graphic processing circuit and/or a general processing circuit; the library 520 can be a storage medium, e.g., a memory, a hard-drive, a cloud storage server; the output interface 530 can be a displayer, a speaker, a printer and/or a storage medium.

The library 520 contains at least one leakage lookup table related to leakage current values for different cell abutment cases. As illustratively shown in FIG. 14, the library 520 contains the transistor leakage lookup table LUT1A shown in FIG. 10A and the transistor leakage lookup table LUT1B shown in FIG. 10B and the leakage probability lookup table LUT2 shown in FIG. 11. The processor 510 configured to perform an analysis to detect boundaries between the abutted cells (referring to operation S210 in FIG. 2 or operation S410 in FIG. 13), identify attributes associated with the cell edges of the abutted cells (referring to operation S220 in FIG. 2 or operation S420 in FIG. 13), identify the cell abutment cases based on the attributes associated with the cell edges (referring to operation S230 in FIG. 2 or operation S430 in FIG. 13), calculate expected boundary leakages between the abutted cells based on leakage current values associated with the cell abutment cases and leakage probabilities associated with the cell abutment cases (referring to operation S240 in FIG. 2, FIG. 6 and FIG. 9 or operation S440 in FIG. 13). The output interface 530 is configured to output the expected boundary leakages in the semiconductor device. In response to the expected boundary leakages exceeds a tolerance range, the processor 510 will adjust the initial layout LO1 (e.g., re-arrange the abutments or locations of cells in the layout) into an adjusted layout LO2, in order to reduce the boundary leakages.

In some embodiments, a method that includes the steps outlined below is provided. A boundary is detected between a first cell and a second cell, which the first cell and the second cell are abutted to each other around the boundary. Attributes associated with cell edges of the first cell and the second cell are identified. A cell abutment case is identified based on the attributes associated with the cell edges of the first cell and the second cell. A boundary leakage between the first cell and the second cell is calculated based on leakage current values associated with the cell abutment case and leakage probabilities associated with the cell abutment case.

In some embodiments, the boundary between the first cell and the second cell includes a P-channel boundary portion and an N-channel boundary portion.

In some embodiments, the cell abutment case includes a first filler depth corresponding to the P-channel boundary portion, a second filler depth corresponding to the N-channel boundary portion, a first abutment type of the cell edges beside the boundary corresponding to the P-channel boundary portion and a second abutment type of the cell edges beside the boundary corresponding to the N-channel boundary portion.

In some embodiments, the first abutment type or the second abutment type is selected from a combination of a source-source abutment, a drain-drain abutment, a source-drain abutment, a source-filler abutment, a drain-filler abutment, a source-fillerbreak abutment, and a drain-fillerbreak abutment.

In some embodiments, the leakage probabilities associated with the cell abutment case are determined by the first abutment type and the second abutment type of the cell abutment cases.

In some embodiments, the boundary leakage is associated with a sum of a first leakage current over the P-channel boundary portion and a second leakage current over the N-channel boundary portion.

In some embodiments, detecting a boundary between the first cell and the second cell is performed by detecting a boundary where a boundary gate for isolating the first cell and the second cell is implemented at the boundary and electrically coupled to system voltages.

In some embodiments, the method further includes searching in a first transistor leakage lookup table for first possible leakage current values of the cell abutment case, and searching in a second transistor leakage lookup table for second possible leakage current values of the cell abutment case. The first transistor leakage lookup table is related to the leakage current values for the cell abutment case in a condition that a boundary gate at the boundary is implemented with a first possible voltage threshold. The second transistor leakage lookup table is related to the leakage current values for the cell abutment case in a condition that the boundary gate at the boundary is implemented with a second voltage threshold, wherein the second voltage threshold is higher from the first voltage threshold.

In some embodiments, the method includes determining a maximal boundary leakage of the cell abutment case based on the first possible leakage current values and the leakage probabilities associated with the cell abutment case, and determining a minimal boundary leakage of the cell abutment case based on the second possible leakage current values and the leakage probabilities associated with the cell abutment case.

In some embodiments, the boundary leakage is calculated based on the maximal boundary leakage, the minimal boundary leakage and a voltage threshold selection ratio.

In some embodiments, the method includes generating a layout based on the calculated boundary leakage between the first cell and the second cell; and based on the layout, fabricating at least one component in the semiconductor device.

Also disclosed is a system for calculating boundary leakage in a semiconductor device. The system includes a library, a processor and an output interface. The library contains at least one leakage lookup table related to leakage current values for different cell abutment cases. The processor is configured to perform an analysis to detect boundaries between the abutted cells, identify attributes associated with the cell edges of the abutted cells, identify the cell abutment cases based on the attributes associated with the cell edges, and calculate boundary leakages between the abutted cells based on leakage current values associated with the cell abutment cases and leakage probabilities associated with the cell abutment cases. The output interface is configured to output the boundary leakages in the semiconductor device.

In some embodiments, the boundary between the first cell and the second cell includes a P-channel boundary portion and an N-channel boundary portion. The cell abutment case includes a first filler depth corresponding to the P-channel boundary portion, a second filler depth corresponding to the N-channel boundary portion, a first abutment type of the cell edges beside the boundary corresponding to the P-channel boundary portion and a second abutment type of the cell edges beside the boundary corresponding to the N-channel boundary portion.

In some embodiments, the first abutment type or the second abutment type is selected from a combination of a source-source abutment, a drain-drain abutment, a source-drain abutment, a source-filler abutment, a drain-filler abutment, a source-fillerbreak abutment and a drain-fillerbreak abutment.

In some embodiments, the leakage probabilities associated with the cell abutment cases are determined by the first abutment type and the second abutment type of the cell abutment cases. The boundary leakages are associated with a sum of a first leakage current over the P-channel boundary portion and a second leakage current over the N-channel boundary portion.

In some embodiments, the semiconductor device is a semiconductor device including a continuous active area, and boundary gates are implemented at the boundaries and electrically coupled to fixed system voltages.

In some embodiments, the processor is configured to search a first transistor leakage lookup table for first possible leakage current values of the cell abutment cases and to search a second transistor leakage lookup table for second possible leakage current values of the cell abutment cases. The first transistor leakage lookup table is related to the leakage current values for the cell abutment cases in a condition that boundary gates at the boundaries are implemented with first possible voltage thresholds. The second transistor leakage lookup table is related to the leakage current values for the cell abutment cases in a condition that the boundary gates at the boundaries are implemented with second voltage thresholds, wherein the second voltage thresholds are higher from the first voltage thresholds.

In some embodiments, the processor is configured to determine maximal boundary leakages of the cell abutment cases based on the first possible leakage current values and the leakage probabilities associated with the cell abutment cases. The processor is configured to determine minimal boundary leakages of the cell abutment cases based on the second possible leakage current values and the leakage probabilities associated with the cell abutment cases. The boundary leakages are calculated based on the maximal boundary leakages, the minimal boundary leakages and a voltage threshold selection ratio.

In some embodiments, the processor is configured to generate a layout based on the calculated boundary leakages between the abutted cells, and the system fabricates at least one component in the semiconductor device based on the layout.

Also disclosed is a method that includes the steps outlined below. Boundary leakages of the semiconductor device are calculated. A layout of the semiconductor device is adjusted based on at least the boundary leakages. Calculating boundary leakages of the semiconductor device includes steps outlined below. A boundary is detected between a first cell and a second cell, which the first cell and the second cell are abutted to each other around the boundary. Attributes associated with cell edges of the first cell and the second cell are identified. A cell abutment case is identified based on the attributes associated with the cell edges of the first cell and the second cell. Boundary leakage between the first cell and the second cell is calculated based on leakage current values associated with the cell abutment case and leakage probabilities associated with the cell abutment case.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    detecting a boundary between a first cell and a second cell in a semiconductor device, wherein the first cell and the second cell are abutted to each other around the boundary;
    identifying attributes associated with cell edges of the first cell and the second cell, wherein the attributes include at least one of terminal types of the cell edges;
    identifying a cell abutment case based on the attributes associated with the cell edges of the first cell and the second cell, wherein the cell abutment case is associated with the terminal types of the cell edges;
    calculating a boundary leakage between the first cell and the second cell based on leakage current values associated with the cell abutment case and leakage probabilities associated with the cell abutment case;
    searching in a first transistor leakage lookup table for first possible leakage current values of the cell abutment case, wherein the first transistor leakage lookup table is related to the leakage current values for the cell abutment case in a condition that a boundary gate at the boundary is implemented with a first voltage threshold; and
    determining a maximal boundary leakage of the cell abutment case based on the first possible leakage current values and the leakage probabilities associated with the cell abutment case.

2. The method of claim 1, wherein the boundary between the first cell and the second cell comprises a P-channel boundary portion and an N-channel boundary portion.

3. The method of claim 2, wherein the cell abutment case comprises a first filler depth corresponding to the P-channel boundary portion, a second filler depth corresponding to the N-channel boundary portion, a first abutment type of the cell edges beside the boundary corresponding to the P-channel boundary portion and a second abutment type of the cell edges beside the boundary corresponding to the N-channel boundary portion.

4. The method of claim 3, wherein the first abutment type or the second abutment type is selected from a combination of a source-source abutment, a drain-drain abutment, a source-drain abutment, a source-filler abutment, a drain-filler abutment, a source-fillerbreak abutment, and a drain-fillerbreak abutment.

5. The method of claim 3, wherein the leakage probabilities associated with the cell abutment case are determined by the first abutment type and the second abutment type of the cell abutment case.

6. The method of claim 2, wherein the boundary leakage is associated with a sum of a first leakage current over the P-channel boundary portion and a second leakage current over the N-channel boundary portion.

7. The method of claim 1, wherein detecting a boundary between the first cell and the second cell comprises:
    detecting the boundary where the boundary gate for isolating the first cell and the second cell is implemented at the boundary and electrically coupled to system voltages.

8. The method of claim 1, further comprising:
    searching in a second transistor leakage lookup table for second possible leakage current values of the cell abutment case, wherein the second transistor leakage lookup table is related to the leakage current values for the cell abutment case in a condition that the boundary gate at the boundary is implemented with a second voltage threshold, wherein the second voltage threshold is higher from the first voltage threshold.

9. The method of claim 8, comprising:
    determining a minimal boundary leakage of the cell abutment case based on the second possible leakage current values and the leakage probabilities associated with the cell abutment case.

10. The method of claim 9, wherein the boundary leakage is calculated based on the maximal boundary leakage, the minimal boundary leakage and a voltage threshold selection ratio.

11. The method of claim 1, further comprising:
    generating a layout based on the calculated boundary leakage between the first cell and the second cell; and
    based on the layout, fabricating at least one component in the semiconductor device.

12. A method, comprising:
- detecting boundaries between abutted cells in a layout of a semiconductor device;
- identifying attributes associated with cell edges of the abutted cells, wherein the attributes include at least one of terminal types of the cell edges;
- identifying cell abutment cases based on the attributes associated with the cell edges, wherein the cell abutment cases are associated with the terminal types of the cell edges;
- estimating maximal boundary leakages and minimal boundary leakages according to leakage current values of the cell abutment cases and leakage probabilities of the cell abutment cases; and
- calculating expected boundary leakages between the abutted cells according to the maximal boundary leakages, the minimal boundary leakages and a voltage threshold selection ratio, for modification of a layout of the semiconductor device.

13. A method, comprising:
- identifying cell abutment cases of boundaries of abutted cells based on attributes that are associated with cell edges of the abutted cells, wherein the attributes include at least one of terminal types of the cell edges, and the cell abutment cases are associated with the terminal types of the cell edges;
- estimating maximal boundary leakages and minimal boundary leakages according to leakage current values of the cell abutment cases and leakage probabilities of the cell abutment cases; and
- calculating boundary leakages between the abutted cells based on the maximal boundary leakages and the minimal boundary leakages associated with the cell abutment cases.

14. The method of claim 13, wherein identifying the cell abutment cases comprises:
- identifying a first filler depth corresponding to a P-channel boundary portion of a boundary between a first cell and a second cell of the abutted cells;
- identifying a second filler depth corresponding to a N-channel boundary portion of the boundary;
- identifying a first abutment type of the cell edges beside the boundary corresponding to the P-channel boundary portion; and
- identifying a second abutment type of the cell edges beside the boundary corresponding to the N-channel boundary portion.

15. The method of claim 14, wherein identifying the first abutment type and identifying the second abutment type comprise:
- selecting the first abutment type or the second abutment type from a combination of a source-source abutment, a drain-drain abutment, a source-drain abutment, a source-filler abutment, a drain-filler abutment, a source-fillerbreak abutment and a drain-fillerbreak abutment.

16. The method of claim 14, further comprising:
- determining the leakage probabilities associated with the cell abutment cases by the first abutment type and the second abutment type of the cell abutment cases; and
- calculating the boundary leakages according to a sum of a first leakage current over the P-channel boundary portion and a second leakage current over the N-channel boundary portion.

17. The method of claim 13, wherein boundary gates for isolating the abutted cells are implemented at the boundaries and electrically coupled to system voltages.

18. The method of claim 13, further comprising:
- searching in a first transistor leakage lookup table for first possible leakage current values of the cell abutment cases when the boundary gates at the boundaries are manufactured with first voltage thresholds; and
- searching in a second transistor leakage lookup table for second possible leakage current values of the cell abutment cases when the boundary gates at the boundaries are manufactured with second voltage thresholds, wherein the second voltage thresholds are different from the first voltage thresholds.

19. The method of claim 18, further comprising:
- determining the maximal boundary leakages of the cell abutment cases based on the first possible leakage current values and the leakage probabilities associated with the cell abutment cases;
- determining the minimal boundary leakages of the cell abutment cases based on the second possible leakage current values and the leakage probabilities associated with the cell abutment cases; and
- calculating the boundary leakages based on the maximal boundary leakages, the minimal boundary leakages, and a voltage threshold selection ratio.

20. The method of claim 13, further comprising:
- generating a layout based on the calculated boundary leakages between the abutted cells for fabricating at least one component in a semiconductor device based on the layout.

* * * * *